C. F. HENIS.
Broiler.

No. 218,440.  Patented Aug. 12, 1879.

WITNESSES.
Saml. P. Hanson
Alfred C. McLellan

INVENTOR.
Charles F. Henis
per G. Morgan Clariage
atty.

UNITED STATES PATENT OFFICE

CHARLES F. HENIS, OF PHILADELPHIA, PENNSYLVANIA.

IMPROVEMENT IN BROILERS.

Specification forming part of Letters Patent No. 218,440, dated August 12, 1879; application filed April 29, 1879.

*To all whom it may concern:*

Be it known that I, CHARLES F. HENIS, of Philadelphia, Pennsylvania, have invented a Broiler for Meats and other Substances, of which the following is a specification.

My invention consists in constructing a broiler of two plates, in which are perforations cupped or flanged, so as to retain the juices of the meat.

Figure 1:
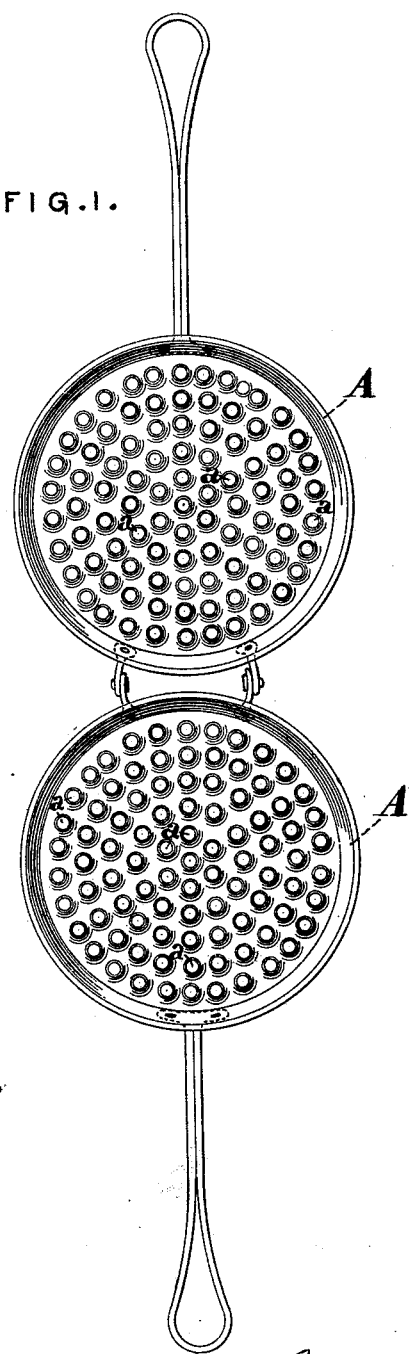
Figure 2:
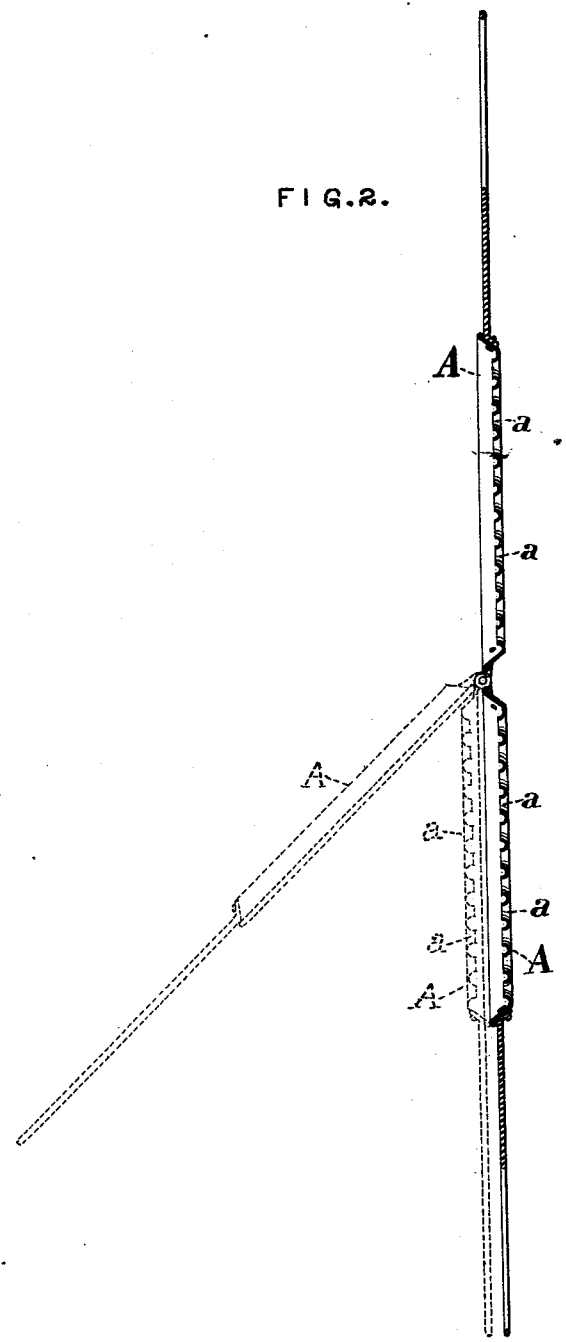

In the drawings, Figure 1 represents a broiler opened wide. Fig. 2 is a sectional view of the same, with dotted lines showing the broiler partly and entirely closed.

The plates A A of the broiler I have ordinarily made of sheet metal, and about the shape and size of common pie-plates, for convenient use over the pot-hole of a cooking-stove; but they may be of any other size, shape, or material, and they may be hinged or otherwise fastened, so as to be conveniently opened and shut. These plates have flat bottoms, and the bottom of each is perforated with a number of holes, $a\ a\ a$, the diameter of which I have made ordinarily about one-fourth of an inch, and the distance from each other about half an inch, though I do not limit myself to any precise size or distance apart, and each of the perforations is cupped or flanged, so that the plate will hold a certain amount of liquid without its escaping through the perforations.

When the meat is put into the broiler and the broiler is placed over the fire, the juices which exude from the meat are caught by the plate below, and are prevented from escaping by the cuppings or flanges of the perforations.

The broiler being now turned over quickly, these juices fall upon the meat and baste it, and the same operation is repeated upon the other side, and so alternately, until the meat is cooked, all the juices of the meat being preserved and applied at each turn to the basting of the meat, which is done thoroughly and effectually, without any manipulation other than to turn over the broiler from time to time while the cooking is going on.

I am aware that broilers have been constructed consisting of two flat-bottomed plates in which were perforations, some of which were cupped or flanged; but those in the outer row of the perforations were left flat to allow the juices of the meat to escape into a trough with which the apparatus was necessarily provided, and they did not nor could not retain the juices and apply them to the basting of the meat, as is done in mine; and I am also aware that broilers have been constructed consisting of one plate having a concavo-convex bottom in which were perforations, all of which were cupped; but in these, as well as the others, though by different means, the juices were drawn away from the meat into a trough with which these latter were also provided, and could not be applied to the basting of the meat, as in mine is done automatically.

I claim as my invention—

1. A broiler consisting of two flat-bottomed plates in which are perforations, each of which is cupped or flanged, substantially as specified.

2. The flat-bottomed plates A A, in which are perforations, each of which is cupped or flanged, for the construction of a broiler, substantially as herein described.

CHARLES F. HENIS.

Witnesses:
G. MORGAN ELDRIDGE,
SAML. P. HANSON.